(12) United States Patent
Russakoff

(10) Patent No.: US 7,773,794 B2
(45) Date of Patent: Aug. 10, 2010

(54) METHOD AND APPARATUS FOR CANDIDATE DETECTION USING HESSIAN PEAK CHARACTERISTICS

(75) Inventor: Daniel Russakoff, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 903 days.

(21) Appl. No.: 11/640,891

(22) Filed: Dec. 19, 2006

(65) Prior Publication Data

US 2008/0144911 A1    Jun. 19, 2008

(51) Int. Cl.
*G06K 9/00* (2006.01)

(52) U.S. Cl. .................................... 382/132
(58) Field of Classification Search ............... 382/128, 382/132; 378/37
See application file for complete search history.

(56) References Cited

U.S. PATENT DOCUMENTS

2005/0135664 A1*  6/2005  Kaufhold et al. ............ 382/131
2006/0173324 A1*  8/2006  Cohen-Bacrie et al. ...... 600/440
2009/0041327 A1*  2/2009  Chen et al. ................. 382/132

OTHER PUBLICATIONS

Hideya Takeo et al., "Detection System of Clustered Microcalcifications on CR Mammogram", IEICE Trans. Inf. & Syst., vol. E88-D, No. 11 Nov. 2005, pp. 2591-2602.

* cited by examiner

*Primary Examiner*—Andrew W Johns
(74) *Attorney, Agent, or Firm*—Birch, Stewart, Kolasch & Birch, LLP

(57) ABSTRACT

A method and an apparatus process images. The method according to one embodiment accesses digital image data including a region of interest; and calculates a Hessian peak characteristic for the region of interest, the calculating step including summing eigenvalues of a Hessian matrix to obtain the Hessian peak characteristic, wherein the Hessian matrix is associated with a pixel property in the region of interest.

20 Claims, 10 Drawing Sheets

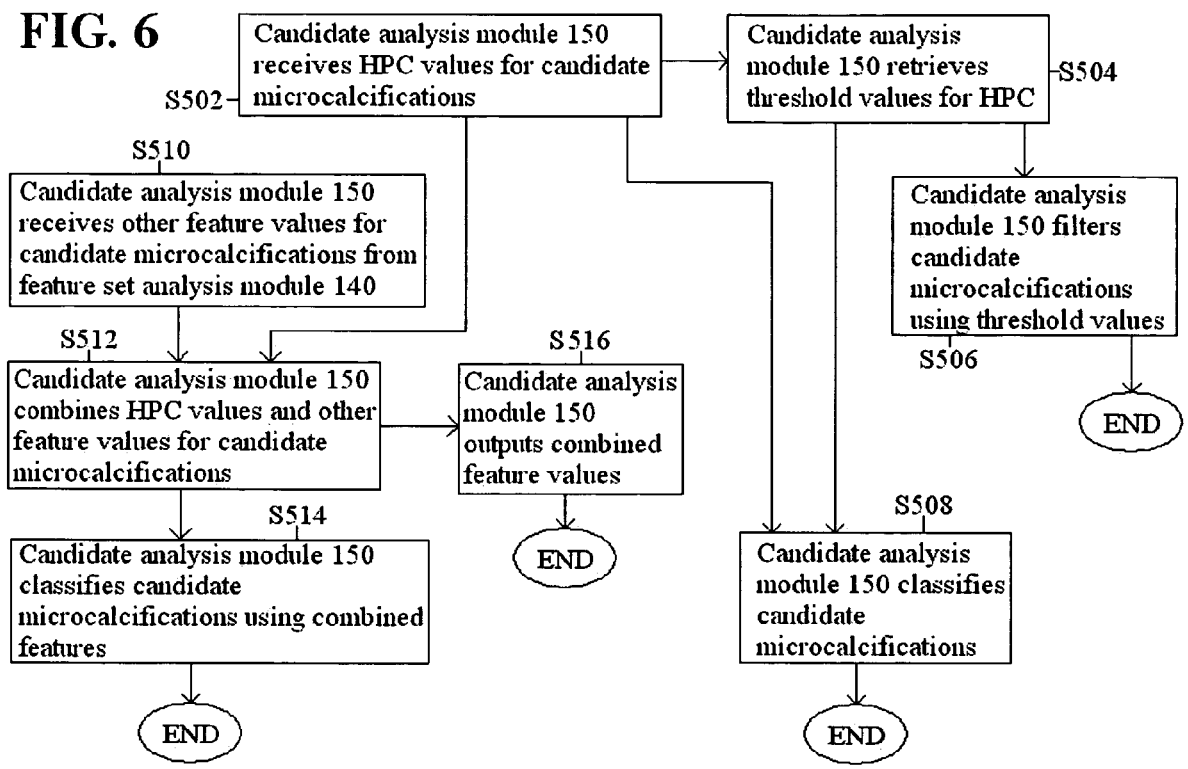

iValThd iValMaxThd iValVol fValStdDevNum fValStdDevAvThd dValFFT1 dValFFT2 dVal8angles dValLen

HPC

RadRateChange

MedMaxRadGrad $r_3'(x) = \dfrac{dr_3}{dx}$

METHOD AND APPARATUS FOR CANDIDATE DETECTION USING HESSIAN PEAK CHARACTERISTICS

BACKGROUND OF THE INVENTION

1. Field of the Invention

The present invention relates to a digital image processing technique, and more particularly to a method and apparatus for processing diagnostic images and detecting microcalcifications in a diagnostic image.

2. Description of the Related Art

Microcalcifications, which are small masses of mineral deposits such as calcium, can be scattered throughout the mammary glands, or may occur in clusters in breasts. Microcalcifications can indicate the presence of small benign cysts. However, microcalcifications can also be an early signal of breast cancer. Hence, medical problems can be diagnosed from mammography images by recognizing and detecting malignant microcalcifications.

A key problem with recognizing and detecting microcalcifications is the large number of false positives (FPs) that occur in vascular regions as the sensitivity of a calcification detection algorithm is increased. An example of an FP is a vascular region mistakenly identified as a microcalcification. A large number of spurious microcalcifications (FPs) are typically detected at the spot level. Such large number of FPs occur because the calcification detection algorithm can be easily confused by high frequency structure of vessels present in mammography images. An additional challenge to accurate detection and recognition of calcifications is the fact that signals generated by isolated calcifications are similar to signals generated by vessels. Since calcifications located within vessels are benign and therefore of no interest, an automated detection system that identifies calcifications in mammography images needs to rule out vascular regions. Difficulties in correctly identifying microcalcifications are compounded by the fact that edge profiles of microcalcifications are not always manifested with a strong contrast against the background, and may be discontinuous and exhibit high noise.

Disclosed embodiments of this application address these and other issues by using a method and an apparatus for generating a characteristic feature for candidate microcalcifications in breasts based on a Hessian matrix, to characterize topography of candidate microcalcifications. The method and apparatus use a Hessian peak characteristic feature for automated characterization and/or classification of candidate microcalcifications into true and false positives. The method and apparatus use the Hessian peak characteristic feature in CAD application for microcalcification detection and processing, with high levels of precision and specificity. The method and apparatus can be used for analysis and characterization of other structures in mammography images, and for analysis and characterization of various structures in diagnostic images other than mammograms. The method and apparatus can be used in other areas of image processing, for analysis and characterization of various structures in digital image data.

SUMMARY OF THE INVENTION

The present invention is directed to a method and an apparatus for processing images. According to a first aspect of the present invention, an image processing method comprises: accessing digital image data including a region of interest; and calculating a Hessian peak characteristic for the region of interest, the calculating step including summing eigenvalues of a Hessian matrix to obtain the Hessian peak characteristic, wherein the Hessian matrix is associated with a pixel property in the region of interest.

According to a second aspect of the present invention, an image processing apparatus comprises: an image data input unit for providing digital image data including a region of interest; and a Hessian module for calculating a Hessian peak characteristic for the region of interest, the Hessian module calculating the Hessian peak characteristic by summing eigenvalues of a Hessian matrix to obtain the Hessian peak characteristic, wherein the Hessian matrix is associated with a pixel property in the region of interest.

BRIEF DESCRIPTION OF THE DRAWINGS

Further aspects and advantages of the present invention will become apparent upon reading the following detailed description in conjunction with the accompanying drawings, in which:

FIG. 6 is a flow diagram illustrating operations performed by a candidate analysis module included in an image processing unit for candidate analysis using Hessian peak characteristics according to an embodiment of the present invention illustrated in FIG. 2.

DETAILED DESCRIPTION

Figure 1:
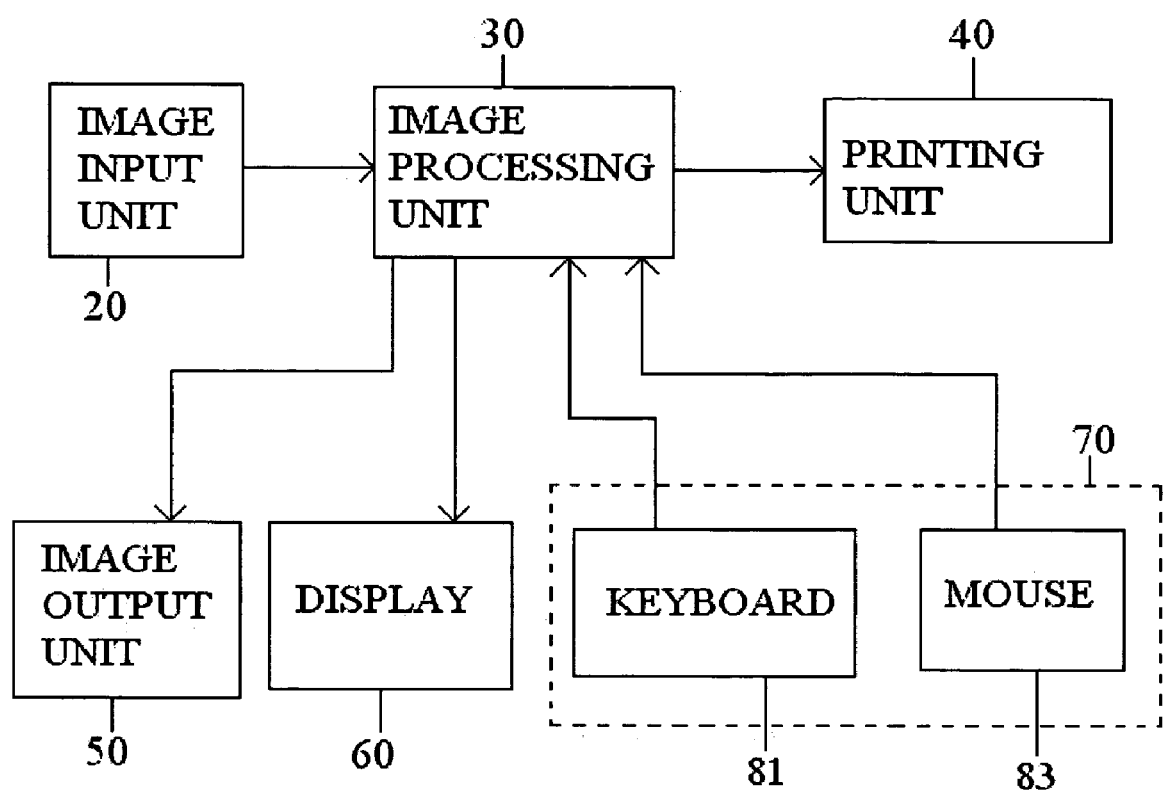
FIG. 1 is a general block diagram of a system including an image processing unit for candidate analysis using Hessian peak characteristics according to an embodiment of the present invention.

Aspects of the invention are more specifically set forth in the accompanying description with reference to the appended figures. FIG. 1 is a general block diagram of a system including an image processing unit for candidate analysis using Hessian peak characteristics according to an embodiment of the present invention. The system 100 illustrated in FIG. 1 includes the following components: an image input unit 20; an image processing unit 30; a display 60; an image output unit 50; a user input unit 70; and a printing unit 40. Operation of the system 100 in FIG. 1 will become apparent from the following discussion.

The image input unit 20 provides digital image data. Digital image data may be medical images such as mammograms, chest X-rays, brain scans, etc. Digital image data may also be other types of images, such as images of natural structures, mineral structures, materials structures, etc. Image input unit 20 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 30 receives digital image data from the image input unit 20 and analyzes candidate structures in digital image data using features based on a Hessian matrix, in a manner discussed in detail below. The features based on a Hessian matrix are called Hessian peak characteristics in the current invention. A user, e.g., a radiology specialist at a medical facility, may view the output of image processing unit 30 via display 60, and may input commands to the image processing unit 30 via the user input unit 70. In the embodiment illustrated in FIG. 1, the user input unit 70 includes a keyboard 81 and a mouse 83, but other conventional input devices could also be used.

In addition to detecting candidate structures in digital image data using Hessian peak characteristics in accordance with embodiments of the present invention, the image processing unit 30 may perform additional image processing functions in accordance with commands received from the user input unit 70. The printing unit 40 receives the output of the image processing unit 30 and generates a hard copy of the processed image data. In addition or as an alternative to generating a hard copy of the output of the image processing unit 30, the processed image data may be returned as an image file, e.g., via a portable recording medium or via a network (not shown). The output of image processing unit 30 may also be sent to image output unit 50 that performs further operations on image data for various purposes. The image output unit 50 may be a module that performs further processing of the image data; a database that collects and compares images; a database that stores and uses analysis results received from image processing unit 30 obtained using Hessian peak characteristics; etc.

Figure 2:
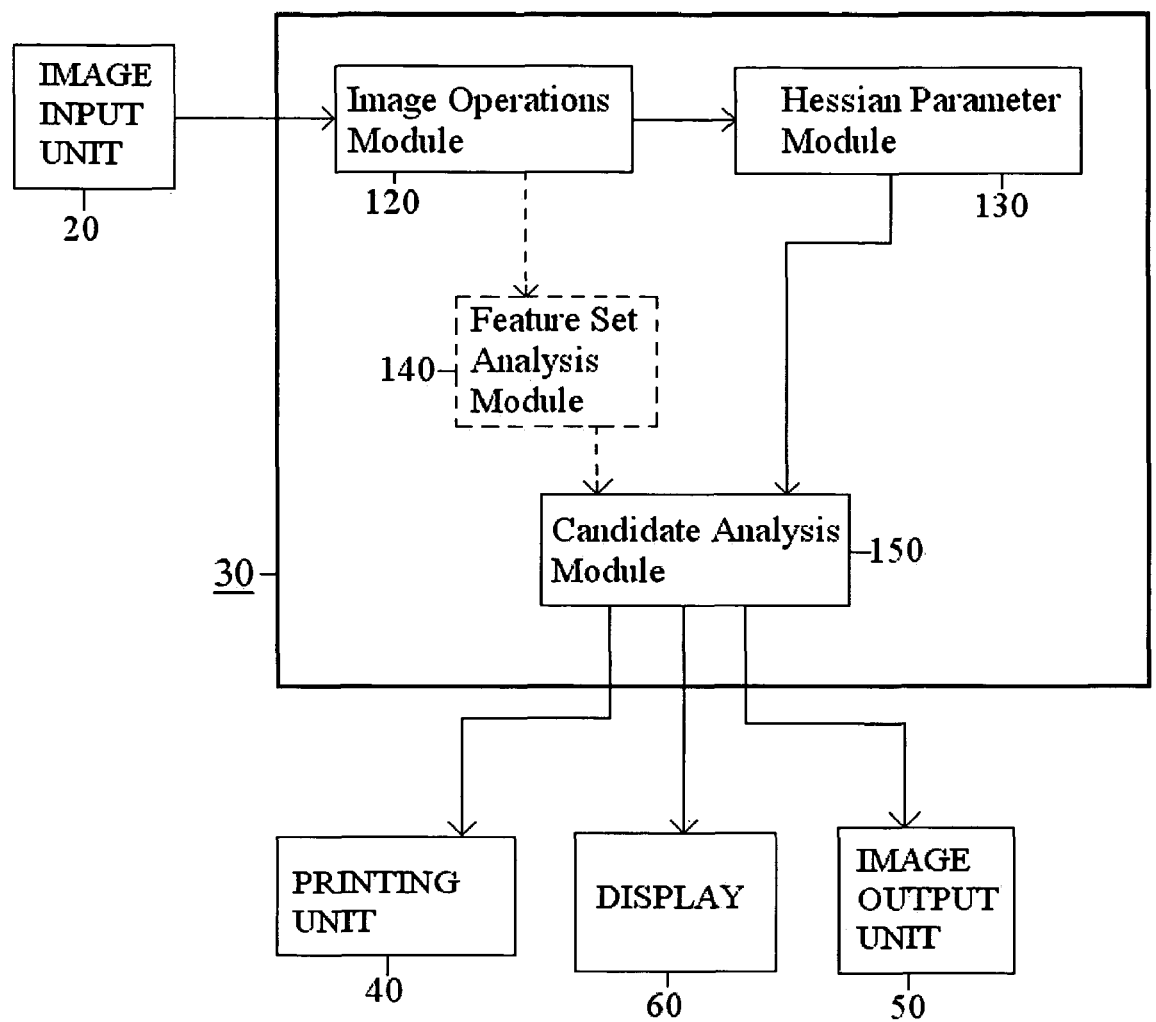
FIG. 2 is a block diagram illustrating in more detail aspects of an image processing unit for candidate analysis using Hessian peak characteristics according to an embodiment of the present invention.

FIG. 2 is a block diagram illustrating in more detail aspects of an image processing unit 30 for candidate detection using Hessian peak characteristics according to an embodiment of the present invention.

As shown in FIG. 2, the image processing unit 30 according to this embodiment includes: an image operations module 120; a Hessian parameter module 130; an optional feature set analysis module 140; and a candidate analysis module 150. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 30 illustrated in FIG. 2 performs preprocessing and preparation of digital image data, extraction of Hessian parameters for the digital image data, optional extraction of additional parameters for the digital image data, and analysis of candidate structures in digital image data.

Operation of image processing unit 30 will be next described in the context of mammography images, for analysis of candidate microcalcifications in mammography images. However, the principles of the current invention apply equally to analysis of other structures in mammography images, to analysis of structures in diagnostic images other than mammography images, and to other areas of image processing, for analysis of various structures in digital image data.

Image operations module 120 receives breast images from image input unit 20 and may perform preprocessing and preparation operations on the breast images. Preprocessing and preparation operations performed by image operations module 120 may include resizing, cropping, compression, color correction, etc., that change size and/or appearance of a breast image.

Image operations module 120 sends the preprocessed breast images to Hessian parameter module 130 and to optional feature set analysis module 140. Hessian parameter module 130 extracts parameters related to Hessian partial derivatives and/or matrices, for breast images. Optional feature set analysis module 140 extracts other parameters relating to breast images. Candidate analysis module 150 receives data from Hessian parameter module 130, and from optional feature set analysis module 140 if present, and analyzes candidate structures in breast images based on received parameters. Candidate structures can be various structures in breast images, such as microcalcifications, cancer structures, vessel structures, etc.

Candidate analysis module 150 outputs information about candidate structures. Output information may include a classification of candidate structures, parameters that characterize candidate structures, etc. Output results from candidate analysis module 150 may be sent to image output unit 50, printing unit 40, and/or display 60. Operation of the components included in the image processing unit 30 illustrated in FIG. 2 will be next described with reference to FIG. 3.

Image operations module 120, Hessian parameter module 130, optional feature set analysis module 140, and candidate analysis module 150 are software systems/applications. Image operations module 120, Hessian parameter module 130, optional feature set analysis module 140, and candidate analysis module 150 may also be purpose built hardware such as FPGA, ASIC, etc.

Figure 3:
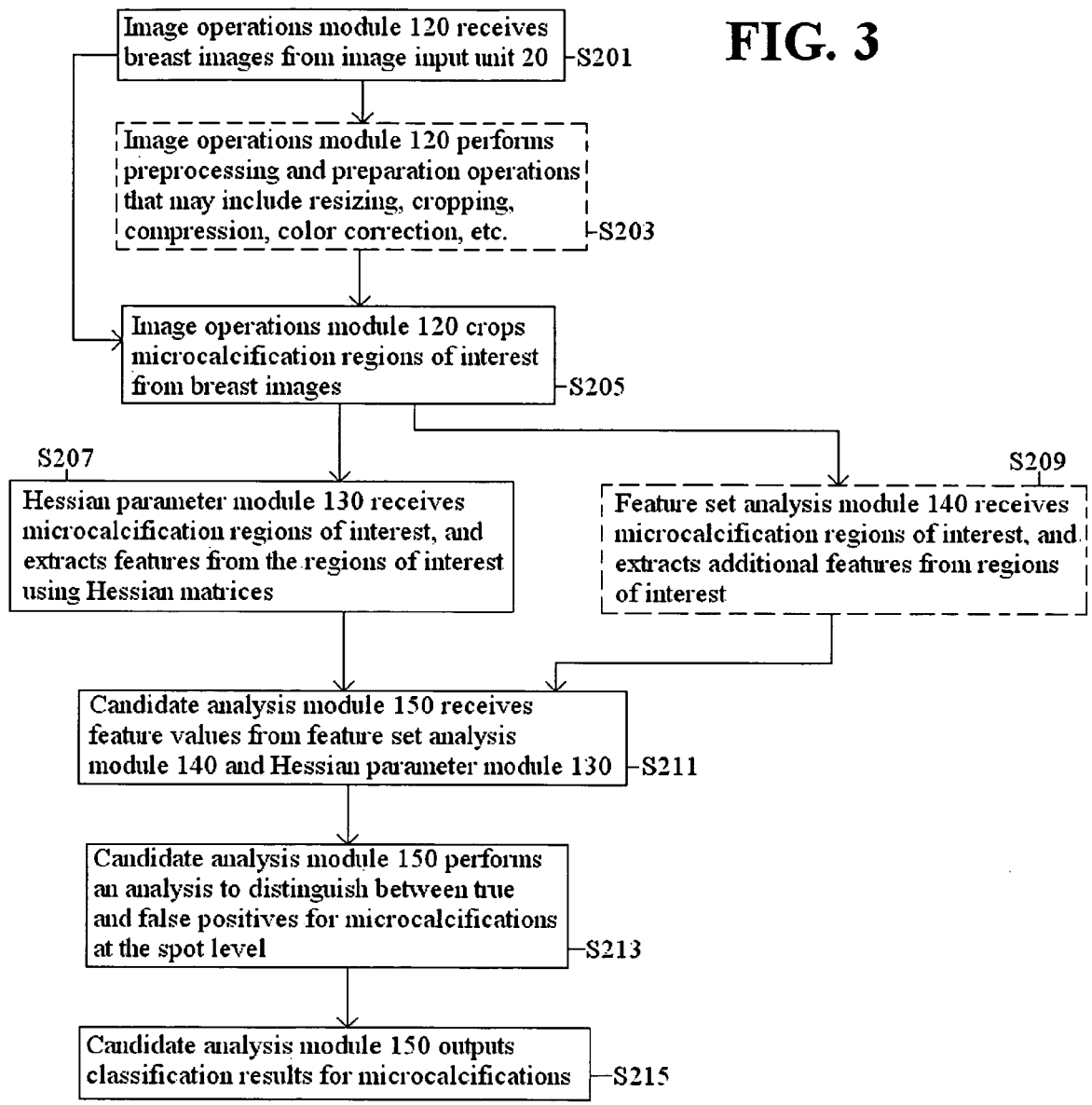
FIG. 3 is a flow diagram illustrating operations performed by an image processing unit for candidate analysis using Hessian peak characteristics according to an embodiment of the present invention illustrated in FIG. 2.

FIG. 3 is a flow diagram illustrating operations performed by an image processing unit 30 for candidate analysis using Hessian peak characteristics according to an embodiment of the present invention illustrated in FIG. 2.

The flow diagram in FIG. 3 describes operation of image processing unit 30 for analysis of candidate microcalcifications in mammography images. However, the principles of the current invention apply equally to analysis of other structures in mammography images, to analysis of various structures in diagnostic images other than mammography images, and to other areas of image processing for analysis of various structures in digital image data.

Image operations module 120 receives breast images from image input unit 20 (S201) and performs preprocessing and preparation operations on the breast images. Preprocessing and preparation operations performed by image operations module 120 may include resizing, cropping, compression, color correction, etc., that change size and/or appearance of a breast image (S203). Preprocessing and preparation operations performed by image operations module 120 include cropping of microcalcification regions of interest from breast images (S205). Microcalcification regions of interest are regions of breast images that are to be tested for presence of microcalcifications. Microcalcification regions of interest may be previously identified by any of a number of algorithms. Identification of microcalcification regions of interest may be designed to be highly sensitive, so that it identifies as many true positive regions of interest as possible.

In an exemplary embodiment, microcalcification regions of interest may be previously selected using selection algorithms described in "Detection System of Clustered Microcalcifications on CR Mammogram", by Hideya Takeo, Kazuo Shimura, Takashi Imamura, Akinobu Shimizu, and Hidefumi Kobatake, Institute of Electronics, Information and Communication Engineers (IEICE) Trans. Inf. & Syst., Vol. E88-D, No. 11, November 2005, the entire contents of which are hereby incorporated by reference.

Hessian parameter module 130 receives microcalcification regions of interest, and extracts features based on Hessian matrices for the regions of interest (S207). These features are called Hessian peak characteristics in the current invention. The calculation of the Hessian peak characteristic is described in detail at FIG. 5.

If present, optional feature set analysis module 140 also receives the microcalcification regions of interest from image operations module 120, and extracts additional features from the regions of interest (S209). The additional features may be typical/conventional features currently used to characterize and/or sort true positive microcalcification spots from false positive microcalcification spots.

Candidate analysis module 150 receives feature values for features analyzed by feature set analysis module 140, and for Hessian features analyzed by Hessian parameter module 130 (S211), and performs an analysis to distinguish between true and false positives for microcalcifications at the spot level (S213). Sizes of microcalcifications at the spot level may depend on the tissue with which the microcalcifications are associated. Candidate analysis module 150 then outputs analysis results such as, for example, detection or classification results, for microcalcifications (S215). Such analysis results may be output to printing unit 40, display 60, and/or image output unit 50.

The operations illustrated in the flow diagram of FIG. 3 increase the specificity for identified microcalcifications, and separate false positives from true positives without a decrease in detection sensitivity.

Figure 4:
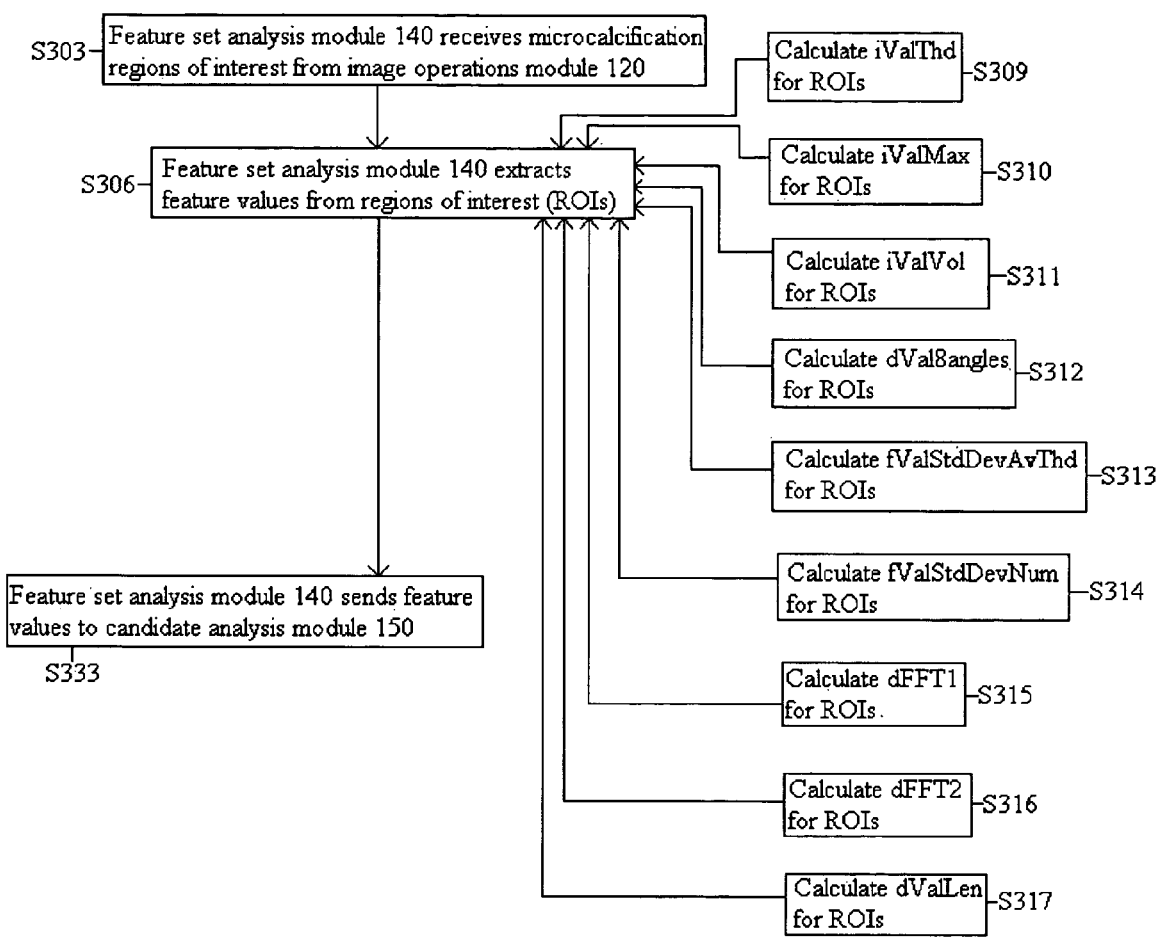
FIG. 4 is a flow diagram illustrating exemplary operations performed by an optional feature set analysis module included in an image processing unit for candidate analysis using Hessian peak characteristics according to an embodiment of the present invention illustrated in FIG. 2.

FIG. 4 is a flow diagram illustrating exemplary operations performed by an optional feature set analysis module 140 included in an image processing unit 30 for candidate analysis using Hessian peak characteristics according to an embodiment of the present invention illustrated in FIG. 2. FIG. 4 illustrates exemplary details for step S209 in FIG. 3.

Feature set analysis module 140 receives microcalcification regions of interest (ROIs) from image operations module 120 (S303), and extracts feature values from the regions of interest (S306). The feature values may be determined using typical/conventional features currently used to distinguish false positive microcalcification spots from true positive microcalcification spots.

In an exemplary embodiment, typical/conventional features used to characterize microcalcification spots may include: iValThd, iValMaxThd, iValVol, dVal8angles, fValStdDevAvThd, fValStdDevNum, dFFT1, dFFT2, and dValLen (S309, S310, S311, S312, S313, S314, S315, S316, and S317).

A description of these typical/conventional features is given below. The iValThd feature represents the threshold level for which a region of calcification interest ($C_i$) is geometrically extracted from a breast image. $C_i$ is the set of all pixels presumed to be associated with a microcalcification region. $C_i$, together with neighboring pixels, are included in the ROI. The iValMaxThd feature represents the difference between the maximum pixel value in $C_i$ and iValThd. The iValVol feature represents the volume above iValThd in $C_i$, where the pixel value of the image is assumed to be the z-axis in a 3D space. The dVal8angles feature represents the variation of radial length (calculated in 8 directions) from the center of gravity of $C_i$. The fValStdDevAvThd feature represents the standard deviation of areas of $C_i$, or of pixel values in $C_i$, extracted using a variety of thresholds. The fValStdDevNum feature represents the standard deviation of pixel values in $C_i$. The DFFT1 feature represents the first frequency at which the Fourier spectrum value falls below 1/10 of the DC component when an FFT is performed in an ROI around the candidate. The dFFT2 feature is the sum of high-frequency power above 1.0 per cycle per mm calculated from the power spectrum used by dFFT1. The dValLen feature represents the length of the longest line that joins two pixels on the boundary of $C_i$ and intersects its centroid. Some typical/conventional features used to characterize microcalcification spots are described in "Detection System of Clustered Microcalcifications on CR Mammogram", by Hideya Takeo, Kazuo Shimura, Takashi Imamura, Akinobu Shimizu, and Hidefumi Kobatake, Institute of Electronics, Information and Communication Engineers (IEICE) Trans. Inf. & Syst., Vol. E88-D, No. 11, November 2005, the entire contents of which are hereby incorporated by reference.

Optional feature set analysis module 140 may use any other features instead of, or in addition to the features described above, to characterize microcalcification spots. After calculation of feature values, feature set analysis module 140 sends feature values to candidate analysis module 150 (S333).

Figure 5:
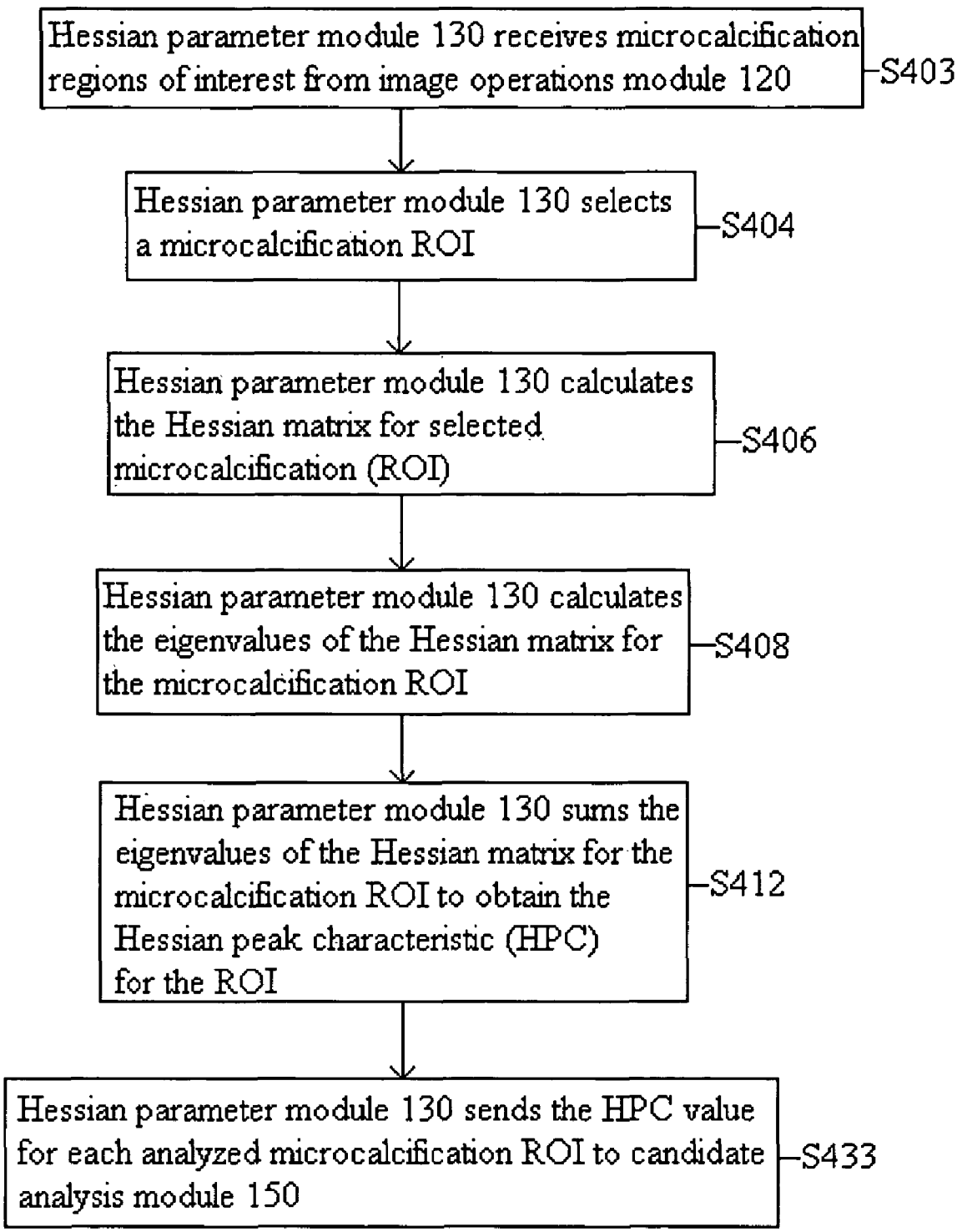
FIG. 5 is a flow diagram illustrating operations performed by a Hessian parameter module included in an image processing unit for candidate analysis using Hessian peak characteristics according to an embodiment of the present invention illustrated in FIG. 2.

FIG. 5 is a flow diagram illustrating operations performed by a Hessian parameter module 130 included in an image processing unit 30 for candidate detection using Hessian peak characteristics according to an embodiment of the present invention illustrated in FIG. 2. FIG. 5 illustrates details for step S207 in FIG. 3.

Hessian parameter module 130 receives microcalcification regions of interest from image operations module 120 (S403), and extracts features from the regions of interest using Hessian matrices.

Hessian matrices can be used to determine how peaked a calcification spot is. The Hessian matrix H for a function $f(x,y)$ includes second partial derivatives, as shown by equation (1) below:

$$H(f(x, y)) = \begin{pmatrix} \frac{\partial^2 f}{\partial^2 x} & \frac{\partial^2 f}{\partial x \partial y} \\ \frac{\partial^2 f}{\partial x \partial y} & \frac{\partial^2 f}{\partial^2 y} \end{pmatrix} \qquad \text{Equation (1)}$$

For a microcalcification ROI, considering the pixel value to be the z-axis in a 3D space, The function $f(x, y)$ is the pixel value as the z-axis in a 3D space, while x and y are spatial coordinates of the pixel inside the microcalcification ROI. The eigenvalues ($\lambda_1, \lambda_2$) of the Hessian matrix H can be used to characterize the topography of $f(x,y)$ at a given point (x,y). For example, if $\|\nabla f(x,y)\|=0$, eigenvalues for which $\lambda_1 > 0$ and $\lambda_2>0$ characterize the topography of a hole, eigenvalues for which $\lambda_1>0$ and $\lambda_2=0$ characterize the topography of a ridge, and eigenvalues for which $\lambda_1<0$ and $\lambda_2=0$ characterize the topography of a valley. A peak occurs for $f(x,y)$ at point $(x,y)$ when conditions 2, 3, and 4 are satisfied:

$$\|\nabla f(x,y)\|=0 \qquad \text{Condition (2)}$$

$$\lambda_1<0 \qquad \text{Condition (3)}$$

$$\lambda_2<0 \qquad \text{Condition (4)}$$

Hence, the sizes and signs of $\lambda_1$ and $\lambda_2$ correlate with peak steepness of a function $f(x,y)$ at point $(x,y)$.

Conditions 2, 3, and 4 provide a powerful method to characterize how peaked a calcification is, by calculating the Hessian of the calcification and summing the eigenvalues of the Hessian.

For this purpose, Hessian parameter module 130 calculates the Hessian matrix for a microcalcification region of interest (ROI), using Equation (1) (S406). Hessian parameter module 130 then calculates the eigenvalues $\lambda_i=eig(H)$ of the Hessian matrix for the microcalcification ROI (S408). Hessian parameter module 130 sums the eigenvalues of the Hessian matrix for the microcalcification ROI (S412). The sum of the eigenvalues of the Hessian matrix is called the Hessian peak characteristic (HPC) in this application, and is expressed as:

$$HPC=\Sigma\lambda_i, \text{ where } \lambda_i=eig(H) \qquad (5)$$

Given a set neighborhood R of a microcalcification ROI, a HPC value for the set neighborhood R can be calculated for pixels $(x,y)\in R$, by formula:

$$HPC=\min_{x,y\in R}(\Sigma eig(H(f(x,y)))) \qquad (6)$$

to characterize the peakedness of the set neighborhood R.

Hessian parameter module 130 then sends the HPC value calculated by formulas (5) and/or (6) for each microcalcification ROI analyzed, to candidate analysis module 150 (S433).

FIG. 6 is a flow diagram illustrating operations performed by a candidate analysis module 150 included in an image processing unit 30 for candidate analysis using Hessian peak characteristics according to an embodiment of the present invention illustrated in FIG. 2. Candidate analysis module 150 receives HPC values for candidate microcalcification ROIs, calculated by formulas (5) and/or (6) (S502). In one embodiment, candidate analysis module 150 also retrieves threshold values for HPC values for true positive microcalcifications (S504) and classifies candidate microcalcifications into true and false positives based on relationships of HPC values to threshold values (S508). The classification results place candidate microcalcifications in a false positive microcalcifications category or in a true positive microcalcifications category. Threshold values are obtained off-line through training, using a large number of false and true positive microcalcifications.

In one exemplary embodiment, threshold values were −6 and −10, and microcalcifications were classified as true positives if their HPC=$\Sigma\lambda_i$ values satisfied the relationship −10<HPC<−6. Microcalcifications were classified as false positives otherwise. In another exemplary embodiment, threshold values were −6.857 and −40, and microcalcifications were classified as true positives if their HPC=$\Sigma\lambda_i$ values satisfied the relationship −40<HPC<−6.857.

In a second embodiment, candidate analysis module 150 retrieves threshold values for HPC values for true positive microcalcifications (S504) and filters candidate microcalcifications based on relationships of HPC values to threshold values (S506). In one exemplary embodiment, threshold values were −6 and −10, and candidate microcalcifications whose HPC values satisfied the relationship −10<HPC<−6 were filtered as potential microcalcifications, for further analysis. Candidate microcalcifications that did not satisfy −10<HPC<−6 were discarded.

In a third embodiment, candidate analysis module 150 also retrieves other feature values from feature set analysis module 140, for candidate microcalcification ROIs (S510). Other feature values may be, for example, values described at FIG. 4. Candidate analysis module 150 then combines HPC values and other feature values for candidate microcalcification ROIs (S512), and may output combined feature values for candidate microcalcifications (S516) that characterize the candidate microcalcifications.

In a fourth embodiment, candidate analysis module 150 retrieves other feature values from feature set analysis module 140, for candidate microcalcification ROIs (S510). Other feature values may be, for example, feature values described at FIG. 4. Candidate analysis module 150 then combines HPC values and other feature values for candidate microcalcification ROIs (S512), and classifies candidate microcalcifications into true and false positives, using combined HPC and other feature values (S514). Candidate analysis module 150 may use a series of trained linear classifiers to determine whether a candidate calcification spot should be classified as a false positive or a false negative and be considered in cluster-level calculations. Cluster-level calculations analyze clusters of microcalcifications. A cluster of microcalcifications is a signal that cancer is present in a mammogram. To identify clusters of microcalcifications, potential microcalcifications are identified in an image, using methods and apparatuses presented in the current application, and neighboring microcalcifications are then grouped into clusters. Using methods and apparatuses presented in the current application, non-microcalcifications at the spot level are reliably identified and removed, hence improving performance and efficiency for further study of clusters of microcalcifications.

The series of linear classifiers that may be used by candidate analysis module 150 are trained off-line, using feature values for HPC, as well as for typical/conventional features such as iValThd, iValMaxThd, iValVol, dVal8angles, fValStdDevAvThd, fValStdDevNum, dFFT1, dFFT2, and dValLen calculated for a large number of true positive and false positive microcalcifications. The series of linear classifiers are trained off-line to determine criteria for classification of a calcification spot as a false positive or a false negative.

Additional embodiments may combine steps S510, S512, S516, or S510, S512, S514, with steps S502, S504, S506, or with steps S502, S504, S508.

Hence, candidate analysis module 150 evaluates HPC values for candidate microcalcifications, evaluates combined HPC and other features for candidate microcalcifications, and classifies candidate microcalcifications, in various embodiments. Candidate analysis module 150 outputs feature values for candidate microcalcifications, classification results for candidate microcalcifications, and/or feature values and classifications results for candidate microcalcifications, to printing unit 40, display 60, and/or image output unit 50.

Figure 7A:
FIG. 7A illustrates exemplary false positive microcalcification spots from breast images.

FIG. 7A illustrates exemplary false positive microcalcification spots from breast images. The false positive microcalcification spots in FIG. 7A are spurious structures that are not microcalcifications. The false positive candidate microcalcifications are located in the center of the images shown in FIG. 7A.

Figure 7B:
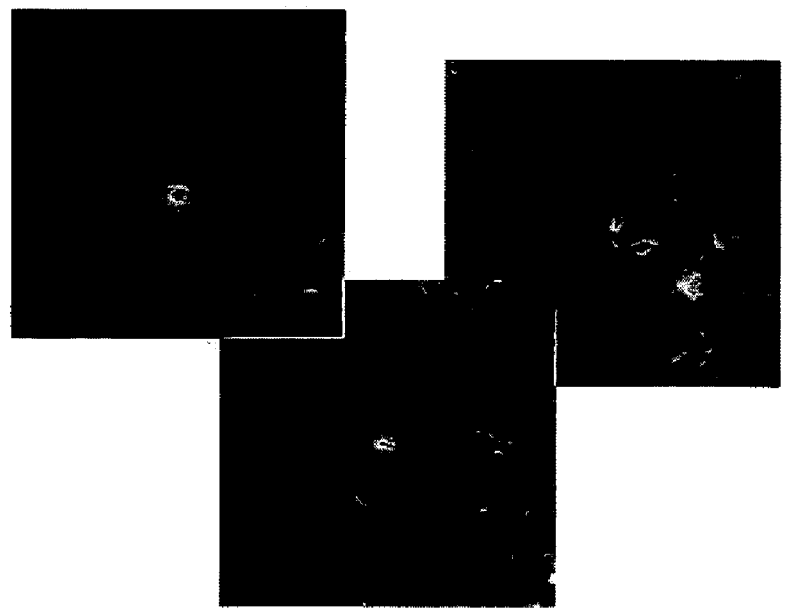
FIG. 7B illustrates exemplary true positive microcalcification spots from breast images.

FIG. 7B illustrates exemplary true positive microcalcification spots from breast images. The true positive candidate microcalcifications are located in the center of the images shown in FIG. 7B.

Figure 8A:
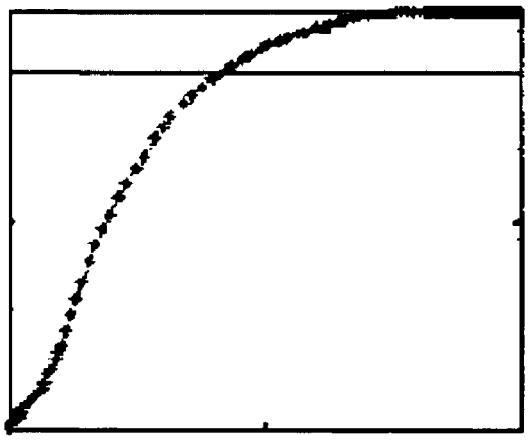
FIGS. 8A, 8B, 8C, 8D, 8E, 8F, 8G, 8H, and 8I illustrate evaluation results for microcalcification spots using typical/conventional features.
Figure 8B:
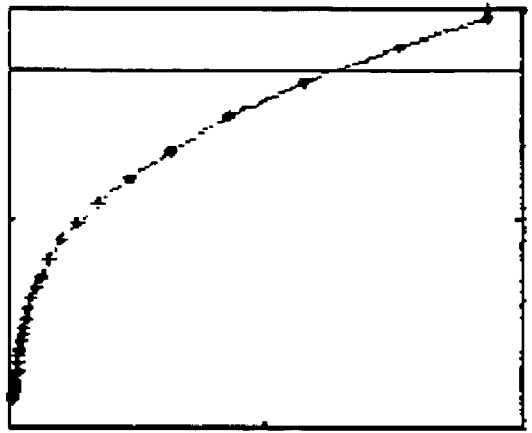
Figure 8C:
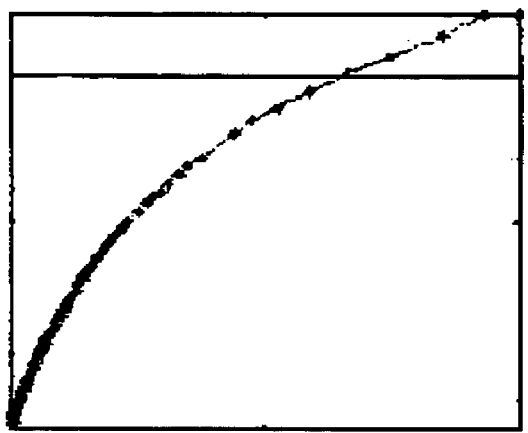
Figure 8D:
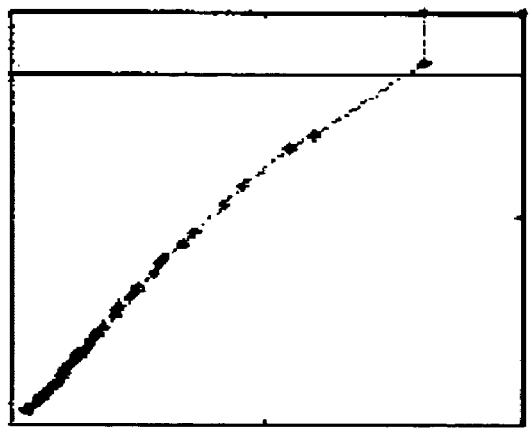
Figure 8E:
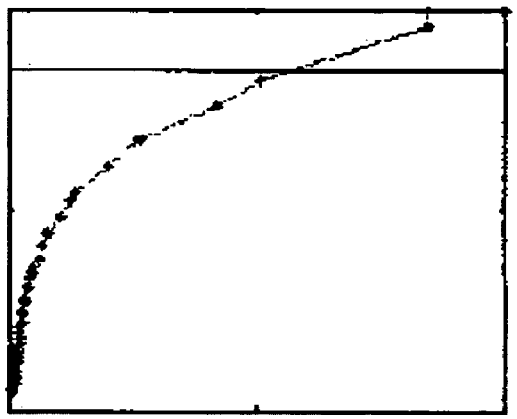
Figure 8F:
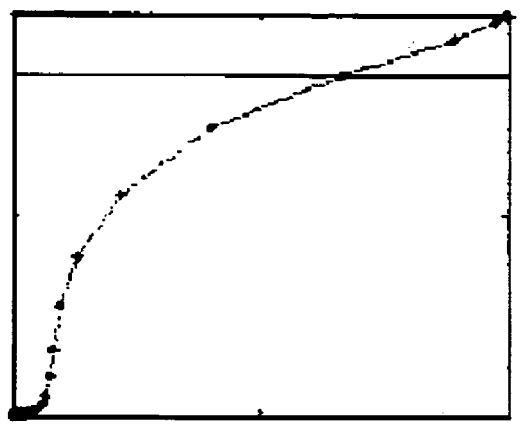
Figure 8G:
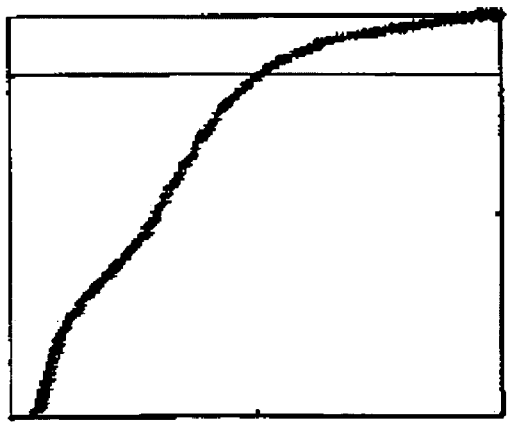
Figure 8H:
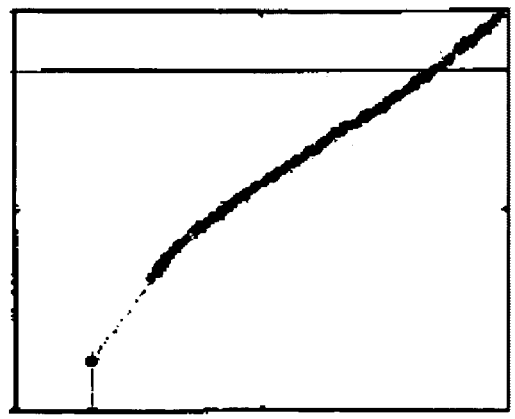
Figure 8I:
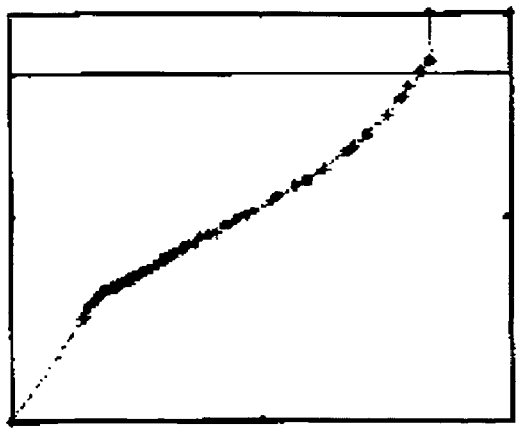

FIGS. 8A, 8B, 8C, 8D, 8E, 8F, 8G, 8H, and 8I illustrate evaluation results for microcalcification spots using typical/conventional features. The curves in FIGS. 8A, 8B, 8C, 8D, 8E, 8F, 8G, 8H, and 8I are ROC curves obtained by evaluating typical features for 3000 microcalcifications for which the status of true or false positive microcalcification was known, from a training set. FIG. 8A is the ROC curve obtained using feature iValThd, where the x-axis is 1-specificity (false positive percentage) and the y-axis is sensitivity (true positive percentage). FIG. 8B is the ROC curve obtained using feature iValMaxThd. FIG. 8C is the ROC curve obtained using feature iValVol. FIG. 8D is the ROC curve obtained using feature fValStdDevNum. FIG. 8E is the ROC curve obtained using feature fValStdDevAvThd. FIG. 8F is the ROC curve obtained using feature dFFT1. FIG. 8G is the ROC curve obtained using feature dFFT2. FIG. 8H is the ROC curve obtained using feature dVal8angles. FIG. 8I is the ROC curve obtained using feature dValLen.

Figure 9A:
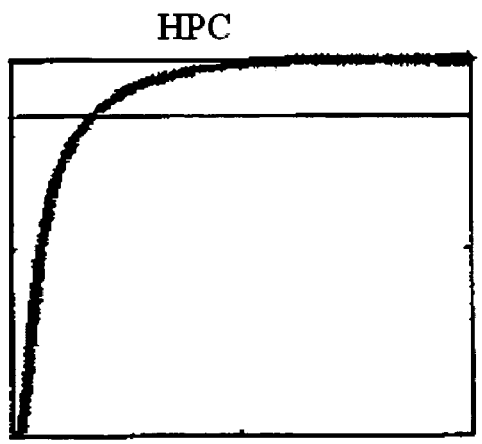
FIGS. 9A, 9B, and 9C illustrate evaluation results for microcalcification spots using new features according to an embodiment of the present invention.
Figure 9B:
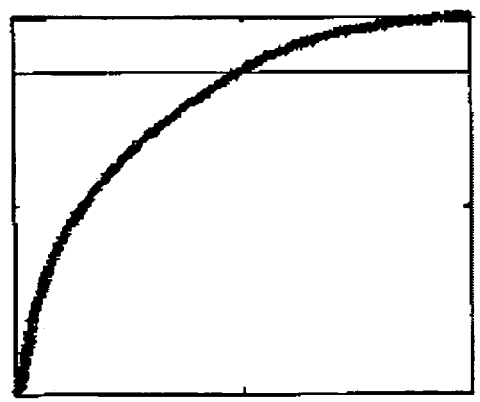
Figure 9C:
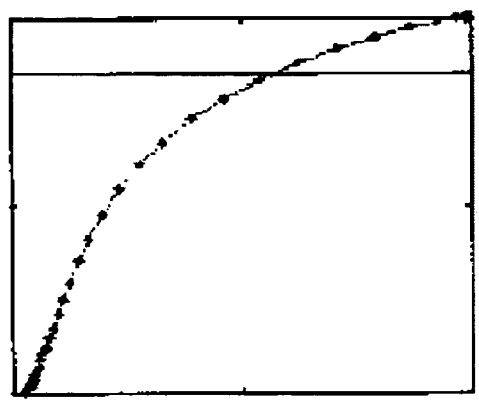

FIGS. 9A, 9B, and 9C illustrate evaluation results for microcalcification spots using new features according to an embodiment of the present invention. The curves in FIGS. 9A, 9B, and 9C are ROC curves obtained by evaluating new features for the same set of 3000 microcalcifications that were used to obtain the ROC curves in FIGS. 8A-8I. FIG. 9A is the ROC curve obtained using the Hessian peak characteristic HPC feature.

Figure 9D:
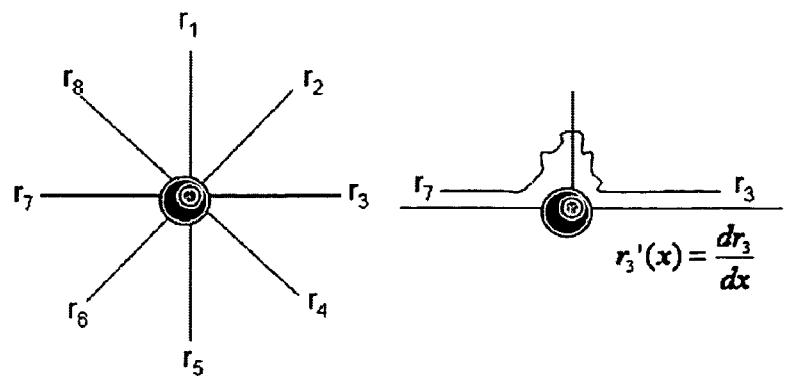
FIG. 9D illustrates aspects of the operation of calculating RadRateChange and MedMaxRadGrad features, according to an embodiment of the current invention.

FIG. 9B is the ROC curve obtained using feature RadRateChange, which quantifies the radial rate of change at the spot level, for a microcalcification. FIG. 9C is the ROC curve obtained using feature MedMaxRadGrad. FIG. 9D illustrates aspects of the operation of calculating RadRateChange and MedMaxRadGrad features, according to an embodiment of the current invention. As illustrated in FIG. 9D, the RadRateChange and MedMaxRadGrad features operate on the set of rays $R=\{r_1, r_2, \ldots, r_n\}$ emanating radially from the center of a suspected microcalcification. RadRateChange (RRC) sums the 1D gradients of all rays emanating from the potential microcalcification, as described by formula $$RRC = \sum_i r'_i(x)$$

where, for example, $$r'_3(x) = \frac{dr_3}{dx}.$$

MedMaxRadGrad (MMRG) calculates the maximum of the gradient along each of the rays and then takes the median of those maximums, as described by formula $MMRG = \text{median}_i (\arg\max_x r'_i(x))$.

As it can be seen from comparing all ROC curves in FIGS. 8A, 8B, 8C, 8D, 8E, 8F, 8G, 8H, 8I, 9A, 9B, and 9C, the area under the ROC curve is largest (closest to 1) for the HPC ROC curve in FIG. 9A. Hence, the HPC characteristic presented in the current application is an excellent feature for classifying spot level microcalcifications and performs better than typical/conventional features, such as iValThd, iValMaxThd, iValVol, dVal8angles, fValStdDevAvThd, fValStdDevNum, dFFT1, dFFT2, dValLen, RadRateChange, and MedMaxRadGrad features.

Disclosed embodiments of this application use a method and an apparatus for generating a Hessian peak characteristic feature for candidate microcalcifications in breasts, to characterize topography and peaking of candidate microcalcifications, and reduce the number of false positives generated during detection of microcalcification clusters. Disclosed embodiments of this application use the Hessian peak characteristic feature for automated characterization and/or classification of candidate microcalcifications into true and false positives, in CAD application for microcalcification detection and processing with high levels of precision and specificity.

Although detailed embodiments and implementations of the present invention have been described in the context of calcifications in mammography images, embodiments and implementations of the present invention are equally applicable to other structures in other anatomical objects besides breasts, and to other structures in other objects besides anatomical objects. Disclosed embodiments of this application can be used for analysis and characterization of other structures in mammography images, and for analysis and characterization of various structures in diagnostic images other than mammography images. Disclosed embodiments of this application can be used in other areas of image processing, for analysis and characterization of various structures in digital image data.

Although detailed embodiments and implementations of the present invention have been described above, it should be apparent that various modifications are possible without departing from the spirit and scope of the present invention.

I claim:

1. An image processing method, said method comprising:
   accessing digital image data including a region of interest; and
   calculating a Hessian peak characteristic for said region of interest, said calculating step including
      summing eigenvalues of a Hessian matrix to obtain said Hessian peak characteristic, wherein said Hessian matrix is associated with a pixel property in said region of interest.

2. The image processing method as recited in claim 1, further comprising:
   classifying said region of interest using said Hessian peak characteristic.

3. The image processing method as recited in claim 2, wherein
   said region of interest is a candidate microcalcification in a breast image,
   said classifying step classifies said candidate microcalcification into a false positive microcalcification or a true positive microcalcification, and
   said pixel property is the pixel intensity.

4. The image processing method as recited in claim 1, further comprising:
   calculating at least one additional characteristic for said region of interest using at least one feature from among iValThd, iValMaxThd, iValVol, dVal8angles, fValStdDevAvThd, fValStdDevNum, DFFT1, dFFT2, dValLen, RadRateChange, and MedMaxRadGrad.

5. The image processing method as recited in claim 4, further comprising:
   classifying said region of interest using said Hessian peak characteristic and said at least one additional characteristic for said region of interest.

6. The image processing method as recited in claim 1, further comprising:
comparing said Hessian peak characteristic for said region of interest with a threshold value.

7. The image processing method as recited in claim 6, further including:
classifying said region of interest using said Hessian peak characteristic and said threshold value, wherein
said region of interest is a candidate microcalcification in a breast image,
said classifying step classifies said candidate microcalcification into a true positive microcalcification or a false positive microcalcification, and
said pixel property is the pixel intensity.

8. The image processing method as recited in claim 6, further comprising:
performing filtering for said region of interest based on results of said comparing step, wherein said region of interest is a candidate microcalcification in a breast image, and said step of performing filtering filters said candidate microcalcification into a true positive microcalcification class if said Hessian peak characteristic for said candidate microcalcification is negative and obeys a predetermined relationship to said threshold value.

9. The image processing method as recited in claim 1, wherein
said region of interest is a candidate microcalcification in a breast image, and
said pixel property is the pixel intensity.

10. The image processing method as recited in claim 1, further comprising:
calculating a maximum Hessian peak characteristic using Hessian peak characteristics for pixels in said region of interest, to classify said region of interest.

11. An image processing apparatus, said apparatus comprising:
an image data input unit for providing digital image data including a region of interest; and
a Hessian module for calculating a Hessian peak characteristic for said region of interest, said Hessian module calculating said Hessian peak characteristic by
summing eigenvalues of a Hessian matrix to obtain said Hessian peak characteristic, wherein said Hessian matrix is associated with a pixel property in said region of interest.

12. The apparatus according to claim 11, further comprising:
a classification module for classifying said region of interest using said Hessian peak characteristic.

13. The apparatus according to claim 12, wherein
said region of interest is a candidate microcalcification in a breast image,
said classification module classifies said candidate microcalcification into a false positive microcalcification or a true positive microcalcification, and
said pixel property is the pixel intensity.

14. The apparatus according to claim 11, further comprising:
a feature set analysis module for calculating at least one additional characteristic for said region of interest using at least one feature from among iValThd, iValMaxThd, iValVol, dVal8angles, fValStdDevAvThd, fValStdDevNum, dFFT1, dFFT2, dValLen, RadRateChange, and MedMaxRadGrad.

15. The apparatus according to claim 14, further comprising:
a classification module for classifying said region of interest using said Hessian peak characteristic and said at least one additional characteristic for said region of interest.

16. The apparatus according to claim 11, further comprising:
an analysis module for comparing said Hessian peak characteristic for said region of interest with a threshold value.

17. The apparatus according to claim 16, further including:
a classification module for classifying said region of interest using said Hessian peak characteristic and said threshold value, wherein
said region of interest is a candidate microcalcification in a breast image,
said a classification module classifies said candidate microcalcification into a true positive microcalcification or a false positive microcalcification, and
said pixel property is the pixel intensity.

18. The apparatus according to claim 16, further comprising:
a filtering module for filtering said region of interest based on results from said analysis module, wherein said region of interest is a candidate microcalcification in a breast image, and said filtering module filters said candidate microcalcification into a true positive microcalcification class if said Hessian peak characteristic for said candidate microcalcification is negative and obeys a predetermined relationship to said threshold value.

19. The apparatus according to claim 11, wherein
said region of interest is a candidate microcalcification in a breast image, and
said pixel property is the pixel intensity.

20. The apparatus according to claim 11, wherein said Hessian module calculates a maximum Hessian peak characteristic using Hessian peak characteristics for pixels in said region of interest, to classify said region of interest.

* * * * *